(12) United States Patent
Eggert et al.

(10) Patent No.: US 8,711,221 B2
(45) Date of Patent: Apr. 29, 2014

(54) VISUALLY TRACKING AN OBJECT IN REAL WORLD USING 2D APPEARANCE AND MULTICUE DEPTH ESTIMATIONS

(75) Inventors: Julian Eggert, Obertshausen (DE); Sven Rebhan, Obertshausen (DE); Volker Willert, Seligenstadt (DE); Chen Zhang, Darmstadt (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 1078 days.

(21) Appl. No.: 12/331,202

(22) Filed: Dec. 9, 2008

(65) Prior Publication Data
US 2009/0213219 A1 Aug. 27, 2009

(30) Foreign Application Priority Data
Dec. 11, 2007 (EP) .................................... 07122829

(51) Int. Cl.
*H04N 7/18* (2006.01)

(52) U.S. Cl.
USPC ........... 348/148; 348/143; 348/E07; 382/103; 382/107; 382/104

(58) Field of Classification Search
USPC ................. 348/148, 143, E07.088, E07.085; 382/103, 107, 104
See application file for complete search history.

(56) References Cited

U.S. PATENT DOCUMENTS

| | | | |
|---|---|---|---|
| 2002/0159627 A1* | 10/2002 | Schneiderman et al. | 382/154 |
| 2006/0034489 A1* | 2/2006 | McClanahan | 382/107 |
| 2006/0187305 A1* | 8/2006 | Trivedi et al. | 348/169 |
| 2007/0262985 A1* | 11/2007 | Watanabe et al. | 345/420 |
| 2008/0239076 A1* | 10/2008 | Luo | 348/148 |
| 2008/0317379 A1* | 12/2008 | Steinberg et al. | 382/275 |
| 2009/0022369 A1* | 1/2009 | Satoh et al. | 382/106 |

* cited by examiner

*Primary Examiner* — Thuong Nguyen
(74) *Attorney, Agent, or Firm* — Fenwick & West LLP

(57) ABSTRACT

Estimating the dynamic states of a real-world object over time using a camera, two dimensional (2D) image information and a combination of different measurements of the distance between the object and the camera. The 2D image information is used to track a 2D position of the object as well as its 2D size of the appearance and change in the 2D size of the appearance of the object. In addition, the distance between the object and the camera is obtained from one or more direct depth measurements. The 2D position, the 2D size, and the depth of the object are coupled to obtain an improved estimation of three dimensional (3D) position and 3D velocity of the object. The object tracking apparatus uses the improved estimation to track real-world objects. The object tracking apparatus may be used on a moving platform such as a robot or a car with mounted cameras for a dynamic visual scene analysis.

18 Claims, 2 Drawing Sheets

VISUALLY TRACKING AN OBJECT IN REAL WORLD USING 2D APPEARANCE AND MULTICUE DEPTH ESTIMATIONS

RELATED APPLICATIONS

This application claims priority under 35 U.S.C. §119(a) to European Patent Application number 07 122 829, filed on Dec. 11, 2007, which is incorporated by reference herein in its entirety.

FIELD OF THE INVENTION

The present invention relates to a method, a tracking apparatus and a computing device for estimating the dynamic state of a real-world object over time using a camera, two dimensional image information and measurements of the distance from the camera to the object.

BACKGROUND OF THE INVENTION

For various systems, visual tracking is one of the key features necessary for analyzing objects in dynamic environments. The visual tracking has been intensively researched during the last decade, leading to applications, for example, in the field of surveillance, collision avoidance and trajectory evaluation.

As described in detail in Aaron Edsinger and Charles C. Kemp, "Toward Robot Learning of Tool Manipulation from Human Demonstration," Computer Science and Artificial Intelligence Laboratory Massachusetts Institute of Technology Cambridge, Mass. (specifically with reference to FIGS. 1 and 10), a robot may utilize the result of visual tracking information forwarded to a visual servoing unit. The visual servoing unit controls the position and orientation of the tracked object in the field of view of a camera by controlling actuators that adapts the position and orientation of the camera.

Visual servoing may involve the use of one or more cameras and a computer vision system to control the position of a robotic end-effector such as manipulators relative to an object being tracked.

One of the problems in tracking systems is the need for accurate internal models of the objects being tracked. For example, in a traffic scene, three dimensional models of cars represented as either volumetric or surface models must be used to indicate the exact physical dimensions of the cars. The models are then fitted to match sensor signal received by a camera. Alternatively, tracking systems locate the objects based on specific information about the appearance of an object such as color. In a general case, however, objects to be tracked are not determined in advance and therefore accurate 3D model or other specific information is unavailable. In this case, tracking systems have to rely on estimates of objects including a three dimensional position and a three dimensional velocity based on a combination of several distinct cues and measurements.

Visual tracking is the capability to visually identify and follow a real-world object over time based on a signal provided by cameras despite changes in its dynamical parameters (for example, position and velocity) and its two dimensional appearance captured by the camera. The appearance as captured by the camera is two dimensional due to the perspective projection of the three dimensional real-world objects onto a two dimensional screen. The appearance of the object may change considerably due to different surface effects attributable to variable external conditions such as external light spectrum, repositioning of light sources, reflectance and shading effects as well as internal properties such as object deformations. Alternatively, the appearance of the object may change simply because of the rotation of the object or linear movement of the object.

SUMMARY OF THE INVENTION

Embodiments provide a method, a tracking apparatus, a humanoid robot and a computer readable storage medium that does not require accurate object models of an object in advance to track the object. The visual tracking apparatus may estimate the three dimensional (3D) position and velocity of the object by analyzing a two dimensional (2D) appearance of the object and integrating a plurality of visual cues associated with depth estimation. The visual tracking apparatus may rely on standard visual cameras and appearance-based tracking that does not require segmenting of the tracked object from its 3D data or any special sensing hardware.

Embodiments also provide a method, a tracking apparatus, a humanoid robot and a computer readable storage medium for tracking arbitrary real-world objects by estimating their 3D position and 3D velocity of the objects using 2D appearance indicators and multicue depth estimations. A camera image is captured at time t. A region of the camera image at time t where the tracked object is expected may be preprocessed using a series of cues to obtain input features at time t. A tracker template may be initialized by using the input features at time t. A region of the visual input at time t is received from external means. The region may be obtained either from additional algorithms (for example, a segmentation algorithm) or by user interaction indicating the position and region of the image captured by the camera. At this time step, the selected region may be stored in the form of a weighting mask. The internal state of the object may be initialized to a position derived from the region, for example, using its centroid, its center of gravity or its averaged position integrated using the weighting mask. A next camera image at time t+dt is captured. A region of the camera image may be preprocessed at time t+dt in the same manner as at time t. By using a 2D-tracker on the input features at times t and t+dt, the appearance of the object according to the 2D position and the 2D velocity of the object in the camera image are estimated. An approximate estimation of the objects depth (distance to the camera) at time t is obtained from an additional cue which can be but need not be visually based. The additional cues measured at two consecutive time steps t and t+dt may serve to approximate changes in depth. The depth measurement may involve, for example, inputs from a second camera of a binocular camera system. A 2D transformation may be performed on the camera images and/or input features at times t and t+dt to extract the relative change of scale or size of the tracked object.

In one embodiment, an estimation of the depth and the depth change of the object coupled with the change in the scale or size of the object improves the depth estimation for the object. For rigid objects, a decrease or an increase in size serves as an indicator for an increase or decrease in the depth of an object, In one embodiment, the 2D position and the 2D velocity of the tracked object based on the estimation of the depth and depth change of the object are converted into global 3D coordinates using camera positioning information. The 3D position of the object may be used to calculate an approximate physical size of the object. The process may be iterated until the object is lost. The object is determined as being lost, for example, using some confidence criterion based on the match between the inputs and templates. A new process may be started to track the same or a new object.

In one embodiment, the changes of the position and orientation of the camera in global space is taken into account to compensate for the motion of the camera and/or the platform on which the camera is mounted.

In one embodiment, uncertainties are addressed by using probabilistic methods to estimate the states of the object.

In one embodiment, the approximate depth and the depth change or the depth velocity may be estimated incrementally by integrating the results over time, for example, using Dynamic Bayesian Filters or Kalman filters.

In one embodiment, instead of a single approximate depth estimation, a series of depth estimations based on different cues or measurements is used. The cues and/or measurements may then be coupled with the estimation based on 2D changes in scale or size.

In one embodiment, the estimation of object depths and extraction of relative change of the scale or the size of the object influence each other. That is, the 2D transformation is estimated by taking the expected depth change or depth velocity into account. An expected decrease or increased in size caused by an increase/decrease in the depth may be considered in the transformation search procedure. Also, the depth of the object may be estimated by using prior information about the expected depth derived from the physical size calculated and the expected change of scale or size of the object being tracked.

In one embodiment, the same principles are applied to higher-order derivatives of the state of the object so that accelerations of the position, the size or the orientation of the object are estimated and used for tracking the object.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
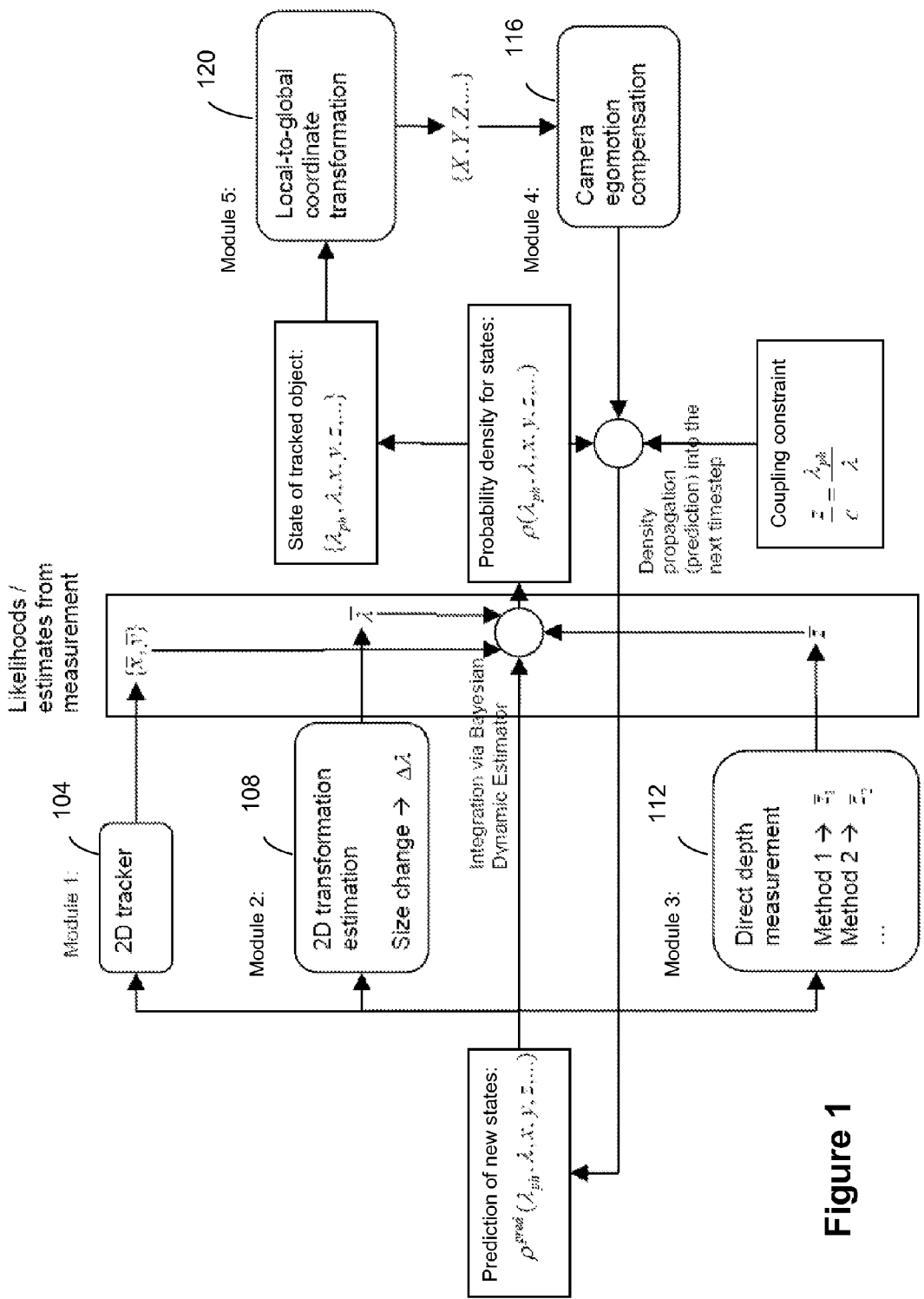
FIG. 1 is a schematic diagram illustrating a tracking apparatus according to one embodiment.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Visual tracking is usually defined as a dynamically constrained search of an object over time. Visual tracking includes the estimation of dynamic states of the object (for example, position and velocity) and other transformation parameters. Both types of dynamic parameters are usually obtained by a correspondence search that maximizes the match between internally stored appearance models and the visual signal representing the current and actual appearance of an object. The maximization is realized by varying the internal appearance models depending on the hypothetical dynamic parameters of objects. The best matches are then processed further to obtain an updated estimate of the parameters that can be used for tracking the object. A survey of tracking mechanisms can be found, for example, in Yilmaz, A., Javed, O., Shah, M. "Object tracking: A survey," ACM Comput. Surv. 38(4) (2006), which is incorporated by reference herein in its entirety.

Conventional techniques for visual tracking include tracking systems and estimating object parameters using solely two dimensional tracking. These conventional techniques involve velocity and acceleration of two dimensional templates. Examples of such tracking system include special algorithms such as correlation-based search of the objects in the visual input. The correlation-based search uses, for example, an Euclidean difference cost function between the template and an input, and mean-field techniques employing a histogram-based cost function as described, for example, in Comaniciu, D., Ramesh, V., Meer, P. "Real-time tracking of non-rigid objects using mean-shift," Computer Vision and Pattern Recognition, 02:2142 (2000); and Comaniciu, V., and Meer, P. "Kernel-based object tracking" (2003), which are incorporated by reference herein in their entirety. Differential methods which constitute a linearized version of the Euclidean cost function (for example, Lucas-Kanade or "KLT" algorithms) also falls under this category. A module working according to any of these techniques is referred to as a "2D-tracker" herein.

More complex object parameters for tracking includes geometrical two dimensional transformations such as rotation, scaling and shearing that can be estimated using template matching techniques. An example is the "KLT" algorithm with special variants for the estimation of affine transformations, for example, as described in Lucas, B. D., Kanade, T., "An iterative image registration technique with an application to stereo vision," In International Joint Conference on Artificial Intelligence (IJCAI81), pp. 674-679 (1981); Tomasi, C. and Kanade, T. "Detection and tracking of point features," Technical Report CMU-CS-91-132, Carnegie Mellon University, (April 1991); and Shi, J. and Tomasi, C. "Good features to track," In IEEE Conference on Computer Vision and Pattern Recognition (CVPR '94), pp. 593-600, Seattle (June 1994), which are incorporated by reference herein in their entirety.

Depth information is usually included as an additional measurement obtained from a separate cue. A state-of-the-art technique is to use a binocular/stereo vision system that computes disparity in two visions to estimate depth of the tracked object, for example, as disclosed in Qian, N., "Binocular disparity and the perception of depth," Neuron 18(3): 359-368 (March 1997), which is incorporated by reference herein in its entirety.

The depth information is included as the state of objects but it does not influence the two dimensional tracking that runs autonomously. Disparity-based depth computation has considerable limitations in terms of reliability and only works well in a narrow depth range defined by a baseline length (i.e., the horizontal displacement between the two cameras). For example, humans determine depth using stereo vision in a range of a few meters. This technique is referred to as "disparity-based depth measurement" herein.

Alternatively, 2D-trackers and 3D-trackers sometimes use accurate internal three dimensional models of the object measured by other means or known in advance, for example, as described in Lou, J., Tan, T., Hu, W., Yang, H., and Maybank, S. J., "3-D Model-Based Vehicle Tracking," IEEE Transactions on Image Processing, Volume 14, pp. 1561-1569 (October 2005); and Krahnstoever, N., and Sharma, R., "Appearance Management and Cue Fusion for 3D Model-Based Tracking," IEEE Computer Society Conference on Computer Vision and Pattern Recognition, Volume 2, pp. 249-254 (2003), which are incorporated by reference in their entirety. In this case, if an accurate match of a transformed and projected version of a three dimensional model is identified from the sensor signals of the camera, the distance to the object can be determined based on the size of the object on the image sensor or a retina.

Another type of binocular 3D-trackers directly uses three-dimensional coordinates as an internal state, and attempts to find a particular appearance of the object in both cameras. In this case, the two dimensional appearance match calculations and the depth estimation are coupled automatically via the 3D coordinates and their projection onto the 2D coordinates of the left and right cameras. These 3D-trackers are often implemented using Dynamic Bayesian Networks (including Kalman filters as a special case) to improve estimations over time.

Conventional multicue trackers integrate multiple cues for the estimation of the same type of parameters, either by combining them according to their reliability or selecting the most reliable cue(s) and performing estimation based only on the most reliable cue(s).

Generally, Dynamic Bayesian Estimators are intensively researched for the temporal estimation and integration of state variables as they occur during tracking. Such conventional techniques include variants of Particle Filter and Kalman Filter, for example, as described in Giebel, J., Gavrila, D., and Schnorr, C., "A Bayesian for multicue 3D object tracking," In Proceedings of European Conference on Computer Vision (2004); Ristic, B., "Beyond the Kalman Filter Particle Filters for Tracking Applications," Artech House Publishers (February 2004); and Arulampalam, S., Maskell, S., Gordon, N. J., and Clapp, T., "A Tutorial on Particle Filters for On-line Non-linear/Non-Gaussian Bayesian Tracking," In IEEE Transactions of Signal Processing, Vol. 50(2), pp. 174-188 (February 2002), which are incorporated by reference in their entirety.

A number of visual tracking systems use depth-sensing camera technology that takes advantage of time-of-flight signals. The depth-sending camera technology provides a robust and dense 3D signal for the field of view, for example, as disclosed in International Publication No. WO 2004/107266A1, which is incorporated by reference herein in its entirety. Usually, these systems rely on the 3D data to detect and track an object. That is, the object is extracted using the depth data.

FIG. 1 is a diagram illustrating an apparatus according to an embodiment. The apparatus includes, among others, a 2D-tracker module 104, a 2D transformation estimation module 108, a direct depth measurement module 112, a camera egomotion compensation module 116, and a local-to-global coordinate transformation module 120.

The 2D-tracker module 104, based on the 2D appearance of an object, estimates the position and velocity of the object. The estimation is performed without the need for accurate models of the object being tracked. Instead, the tracking templates (i.e., the prototypical parts of the scene that should be tracked) are directly extracted from the input image. In this way, general or arbitrary shaped objects can be tracked without limitations on the appearance and class/type of the object.

The 2D transformation estimation module 108 estimates several transformation parameters to find the best match between the template and the input. The transformation includes scaling and the rate of scale change. For example, a scale change of 0.1 between two tracking time steps means that the 2D appearance of the tracked object (i.e., its appearance as captured by the camera) grows by 10% in size.

The direct depth measurement module 112 may include one or more sub-modules that provide independent measurements of the depth of the object (i.e., the distance from the object to the camera). The depth measurements may, however, not be very reliable. In one embodiment, two sub-modules are provided. A first sub-module measures the depth using a dense binocular disparity by comparing local regions of images captured by the left and right cameras. A second sub-module implements a global binocular system that attempts to find the object in the left and the right camera images and calculates a single depth value for a tracked object from the displacement between the two matches.

The location-to-global coordinate transformation module 120 transforms coordinates from the camera coordinate system into a global coordinate system and vice versa. In this case, the "complete" 3D camera coordinates for each point consist of the 2D camera coordinates plus a depth value. Assuming that the camera images can be rectified to account for lens distortions so that the camera can be treated as a sort of "pinhole-camera" and knowing the position and orientation of the camera in global space, the coordinate transformations can be found via geometrical considerations. The entire transformation from one coordinate system to another can then be described in terms of a translation, an orthonormal projection and a perspective projection.

The camera egomotion compensation module 116 measures or estimates changes of the position and orientation of the camera in the global space to quantify a motion of the system with the camera. This is advantageous especially for the case where cameras are mounted on autonomously moving platforms such as moving cars or robots with vision systems.

In one embodiment, the apparatus receives 2D input image with a size of w*h pixels from a camera that is attached to a platform. The platform may be movable. It is assumed that the approximate position and orientation of the platform with respect to a global coordinate system and the approximate position and orientation of the camera (or two cameras, in case depth measurement is based on binocular disparity) with respect to the platform are known at any moment in time. This allows the conversion of coordinates back and forth between the global 3D coordinate systems and the 3D coordinate systems aligned with the cameras.

Furthermore, it is assumed that the projection from the camera 3D coordinates to the camera 2D camera input coordinates and vice versa are known. This allows conversion back and forth between the global 3D coordinate system and the 2D camera input coordinate system.

The process according to one embodiment of the invention is explained herein. First, a 2D camera input is preprocessed using a series of n cues, resulting in a set of n images. The cues can be obtained by simple preprocessing such as applying orientation, contrast or color extraction filters on the input image. More sophisticated measures that are specific to a particular object such as expected color may also be used. The exact choice of the cues is not of relevance for this embodiment as long as the cues contain sufficient information to enable tracking of an object using the preprocessed camera image. The different cues may convey uncorrelated information about the object to allow deficient tracking from one cue to be compensated by other cues, which makes the overall process robust against input variations. Most of the following steps use n cues extracted from the preprocessed input image, hereinafter referred to as the "n input features."

In one embodiment, to reduce resources needed for processing, it is possible to limit the preprocessing to a limited region of the 2D camera field of view. The region of the image for processing can, for example, be determined from an estimated position, size and velocity of the tracked object. After the tracking starts, all these parameters may be estimated continuously by the tracking system so that the parameters are readily available and the region can be adjusted accordingly at each time step.

The apparatus needs an approximate idea of how the tracked object should look like. For this purpose, the apparatus may be provided with a 2D appearance template from a source, which works in the same space as the input features. In practice, this means that the apparatus obtains such template from sources such as user interaction or other modules not described here (for example, memory modules that can provide a previously recorded appearance template) or that the apparatus obtains position and area information again from user interaction or from other modules, and extracts the 2D appearance template using the current input features. In detail, extracting the template requires indication of a position and an area that is provided directly in 2D camera input coordinates or indication that can be converted to 2D camera input coordinates. The internal state of the object used to describe the objects 2D appearance is composed of the template, the position in 2D camera coordinates and the weighting mask, which can be obtained from the indicated area. For example, if the position is provided in 3D coordinates, the 3D position will also be part of the objects state as well as supplementary information such as assumed velocities and sizes.

After initializing the tracker, the object can be searched in subsequent images by finding the parts of the visual scene where the 2D appearance template and the input features match substantially. In one embodiment, the finding of the parts is accomplished by the 2D tracker, which may be implemented as a state-of-the-art multicue Dynamic Bayesian Tracker operating incrementally and statistically. The result from this module is a probabilistic map that indicates the probability that the tracked object currently is in some particular 2D position and has some particular 2D velocity.

If the 2D appearance of the object changes considerably over time, it is useful to incorporate steps to adapt cues and templates into the tracking procedure. This step readjusts the 2D appearance template and/or parameters of object specific cues.

The depth (i.e., the 3D distance) between the object and the camera may be estimated using two different depth estimation methods coupled to operate on different cues. The depth estimation methods operate in a complementary way to compensate weaknesses of each method.

One of the depth estimation may be a direct depth estimation using conventional techniques such as binocular vision. This direct depth estimation itself may be a combination of several different categories of methods. The second technique may be the depth change estimation based on observation of the change in the size of the 2D appearance of an object captured by a single camera. This technique is based on the fact that the size of the 2D appearance of an object increases or decreases as the distance of the object increases or decreases. If the objects depth and the depth velocity are known, the expected size change of the 2D appearance of the object can be estimated. Similarly, if the depth and the change in the size of 2D appearance of the object are known, the depth velocity can be known. The two depth estimations (i.e., the direct estimation and the estimation on the change of 2D size) are, therefore, used in conjunction and to design a 3D tracking apparatus that takes advantage of the combination of different properties of the two depth estimation methods. In this way, stable and convenient 3D tracking of an arbitrary object may be achieved by relying mostly on its 2D appearance and 2D appearance change without requiring any accurate 3D model of the object.

Coupling of the two different depth estimation methods, in combination with binocular techniques, provide advantages to the 3D object tracking apparatus. The binocular techniques operate well in a close distance to the camera depending on the camera baseline length. The depth estimation based on the size change of the tracked object, however, can operate over a larger range of distances. Both methods can, therefore, reinforce each other. For example, an object having its depth accurately measured in a close distance range can be have its depth tracked by measuring its change in size as it moves out of the range where the 3D estimation of binocular systems provides an accurate result.

In one embodiment, the size change in the 2D appearance of an object is extracted using a template matching procedure, described above as 2D transformation estimation. The apparatus searches for the affine transformations A that provide the best match between the 2D appearance template and the input image. At each time step $t_k$, current transformation state $A(t_k)$ represents the best description of the current 2D appearance of the tracked object in terms of its template. The currently tracked object may correspond to the 2D appearance template transformed by a certain amount (for example, rotated by 5 degrees) and scaled by a certain amount (for example, 10%). Transformation state $A(t_{k+1})$ in the next time step $t_{k+1}$ is then estimated by propagating the transformation state $A(t_k)$ into the future and a new template matching is started based on a transformation estimation search. In one embodiment, from each affine transformation state, the size $\lambda$ is extracted by approximating it as a composition of a scaling and a rotation operation according to the following equation:

$$A(t_k) = \begin{pmatrix} a_{1,1} & a_{1,2} \\ a_{2,1} & a_{2,2} \end{pmatrix} \approx \begin{pmatrix} \lambda & 0 \\ 0 & \lambda \end{pmatrix} \cdot \begin{pmatrix} \cos(\alpha) & -\sin(\alpha) \\ \sin(\alpha) & \cos(\alpha) \end{pmatrix} \quad [\text{Eq. 1}]$$

This means that the scale $\lambda$ can be calculated directly from the determinant of the transformation state matrix. The results from two consecutive time steps can then be subtracted to calculate the transformation change, for example, the scale transformation change $\Delta\lambda$ between two time steps. The scale transformation change $\Delta\lambda$ quantifies the size change of the 2D appearance.

In one embodiment, the direct depth estimation based on a binocular input is a standard disparity-based dense (i.e., pixel-wise) depth measurement followed by an extraction of a single approximate depth for the entire object being tracked using the object weighting mask (for example, by spatial integration of the dense depth measurement with the mask). These measurements are integrated over time using a Dynamic Bayesian Estimator. An additional second binocular depth measurement incorporated is a direct search of the 2D appearance template extracted from the first camera in the second camera using, for example, cross-correlation or the template matching techniques. From the relative displacements between the positions where the template is found in a left image from the left camera against a right image in the right camera, a disparity is extracted that can also be used as a basis for depth determination.

The direct depth measurement provides indications on the depth of the object, which are often unreliable. Using the depth from consecutive time steps, the velocity in depth of the moving object relative to the observer/the camera platform is extracted. If the camera platform itself is moving and the parameters of this motion are known, this effect can be compensated, for example, by subtracting the position and motion of the camera from the object parameters to obtain the object parameters in absolute coordinates.

Figure 2:
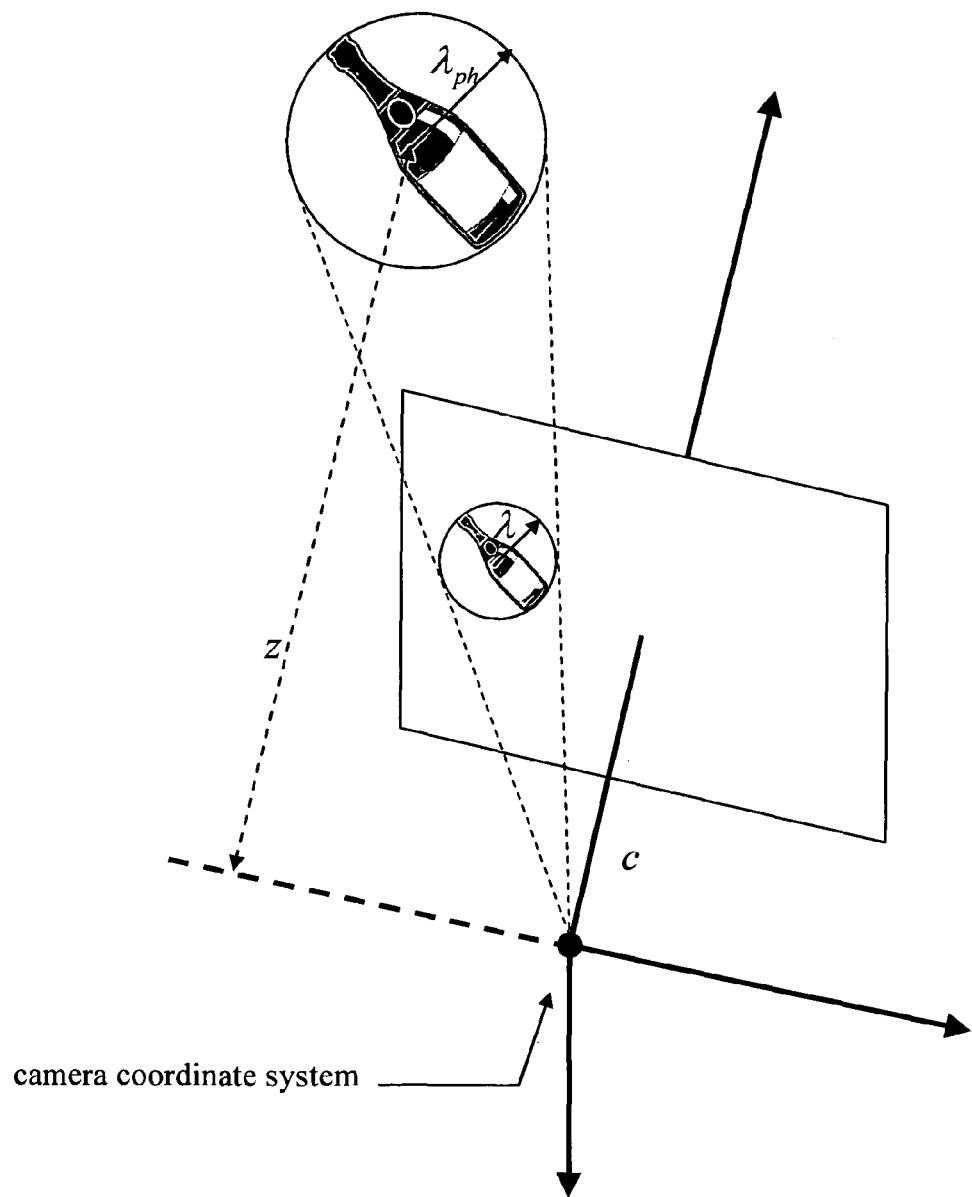
FIG. 2 is a conceptual diagram illustrating mathematical relationship between the depth of an object, the physical size of the object, and two dimensional size of the object, according to one embodiment.

FIG. 2 is a diagram illustrating the mathematical relationship between the object, depth, the physical size of the object, and 2D appearance size of the object. The apparatus delivers a 2D appearance size change measurement in addition to the direct depth measurement, as described above. For generally rigid objects in a calibrated camera, the relationship between the physical size $\lambda_{ph}$ of the object, the 2D appearance size $\lambda$ of the object and the depth z of the object is as follows:

$$\frac{z}{c} = \frac{\lambda_{ph}}{\lambda} \quad [\text{Eq. 2}]$$

where c is a constant that compresses several parameters such as the camera focal length, the 2D screen size and a tracking template size.

Equation 2 indicates the fact that the 2D appearance size $\lambda$ and the depth z are inversely proportional to each other. That is, an object further away or closer to the camera appears smaller or larger in the camera.

In one embodiment, equation 2 couples the direct depth measurement with the inference of the depth based on the change in 2D appearance size. A tracked object is represented by a state containing, among others, velocities, parameters $\lambda_{ph}, \lambda$ and $\{x,y,z\}$. The direct depth measurement provides, at each time step, a new estimate for z. The measurement based on the 2D appearance size provides, at each time-step, a new estimate for $\lambda$. The 2D position tracking together with the depth provides a new estimate for the global position $\{x,y,z\}$ of the object at each time step. The physical size $\lambda_{ph}$ is an internal parameter. The apparatus can receive additional indications about its state from other sources including, among others, other sensory measurements, prior knowledge about the physical size of a particular object and a supervised input from an interacting person.

The tracking apparatus takes the current state parameters $\lambda_{ph}(t_k)$, $\lambda(t_k)$ and $\{x,y,z\}(t_k)$ to predict the expected state parameters $\hat{\lambda}_{ph}(t_{k+1})$, $\hat{\lambda}(t_{k+1})$ and $\{\hat{x},\hat{y},\hat{z}\}(t_{k+1})$ for the next time step based on a dynamical model for the state parameters (for example, an object has a constant physical size, an object moves with a constant depth velocity or the 2D appearance size changes according to equation 2) and couple them with the newly measured estimates for $\lambda$ (from 2D size estimation), z (from direct depth estimation) and $\{x,y\}$ (from 2D position estimation) to obtain updated estimations for the new state parameters $\lambda_{ph}(t_{k+1})$, $\lambda(t_{k+1})$ and $\{x,y,z\}(t_{k+1})$ under the constraint of equation 2. In FIG. 1, the newly measured estimates are denoted by $\bar{\lambda}$, $\bar{z}$ and $\{\bar{x},\bar{y}\}$ to differentiate the newly measured estimates from the "true" estimates.

In one embodiment, this is performed using probabilistic methods such as the prediction-confirmation framework of Dynamic Bayesian Estimators, Recursive Bayesian Filters or Stochastic Dynamic Estimators for a probability density that comprises at least the considered state parameters $\rho(\lambda_{ph}, \lambda, x, y, z, \ldots)$ that improves over time to obtain the best estimate of the state parameters based on all past direct depth measurements and 2D appearance size change measurements. The newly measured estimates correspond to the probabilistic likelihoods. From the current probability density, the most probable parameters $\lambda_{ph}$, $\lambda$ and z that best describe the state of the tracked object (e.g., by selecting the point of maximal probability, but different methods exist to achieve this) are extracted. Of course, other object parameters such as the 2D position and velocity of the object (in camera coordinates) are provided by the appearance-based 2D tracking module 104. Together with the size and depth parameters, the 3D position and velocity of the tracked object may then be determined by the local-to-global coordinate transformation module 120. Furthermore, the combination of 3D tracking and keeping track of the position and orientation of the camera by the camera egomotion compensation module 116 allows compensation for egomotion effects so that objects can be tracked reliably even if the camera changes its location. Compensation of the egomotion effect is particularly relevant for applications related to visually guided robots or cars with mounted cameras for surveillance of other traffics or 3D tracking of objects while the robot/car itself is moving.

The method or apparatus disclosed herein may be used, for example, in a humanoid robot and an automobile.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for visually tracking a moving real-world object by estimating a three dimensional position and a two dimensional velocity of the moving object, the method comprising:

capturing a first image at a camera at a first time;

processing an image region of the first captured image to obtain first visual cues representing first input features of the moving object to be tracked, the image region in the first image being the region the moving object is expected to be located at the first time;

initializing a 2D tracker template based on the first input features;

capturing a second image at the camera at a second time subsequent to the first time;

processing the second captured image to obtain second visual cues representing second input features;

at a processor, determining a two dimensional position of the moving object to be tracked from the second captured image by estimating parameters of a two dimensional transformation on the determined object in the first captured image or the first input features that best match the determined object in the second captured image or the second input features;

determining a two dimensional velocity of the object to be tracked based on the position of the moving object in the first and second captured images;

estimating a depth of the moving object to be tracked at the first time based on a third cue obtained at the first time;

estimating a change of the depth of the moving object to be tracked between the first time and the second time based on the third cue and a fourth cue obtained at the second time;

determining a relative change of size of the moving object to be tracked from the first captured image and the determined object from the second captured image by performing a two dimensional transformation on the determined object in the first and second captured images or the first and second input features;

updating the estimated depth and the change of the depth of the moving object to be tracked based on the relative change of the size of the moving object to be tracked;

combining the updated depth of the moving object to be tracked, the change of the depth of the moving object to be tracked, two dimensional position of the moving object to be tracked, and the two dimensional velocity of the moving object to be tracked to obtain a three dimensional coordinate of the object to be tracked at the second time; and outputting the three dimensional coordinate of the object to be tracked and tracking the moving object.

2. The method of claim 1, further comprising estimating the size of the object based on the three dimensional coordinate of the object.

3. The method of claims 1, wherein estimating the change of the depth of the object comprises integrating measurements associated with depth over time.

4. The method of claim 1, where estimating the change of the depth of the object comprises processing a plurality of depth estimations, each depth estimation obtained from different cues or measurement techniques.

5. The method of claims 1, wherein the two dimensional transformation is based on a change in a size of the appearance of the object indicating the change of depth in the object.

6. The method of claim 1, further comprising compensating motions of the camera or a platform on which the camera is mounted by taking into account changes in a position and an orientation of the camera in global space.

7. The method of claim 1, wherein the two dimensional position and the two dimensional velocity of the object are estimated using a probabilistic method.

8. The method of claims 1, further comprising processing higher-order derivatives of state parameters of the object.

9. The method of claim 1, further comprising sending the three dimensional coordinate of the object to a visual servoing unit controlling a field of view of the camera by controlling actuators.

10. The method of claim 1, wherein the depth of the object and the depth change of the object are estimated using Bayesian filters or Kalman filters.

11. The method of claim 1, wherein the two dimensional position of the object in the second image is determined by using a multicue Dynamic Bayesian Tracker.

12. A tracking apparatus including a processor and a memory storing instruction, the instructions when executed by the processor cause the processor to:

capture a first image at a camera at a first time;

processing an image region of the first captured image to obtain first visual cues representing first input features of the moving object to be tracked, the image region in the first image being the region the moving object is expected to be located at the first time;

initialize a 2D tracker template based on the first input features;

capture a second image at the camera at a second time subsequent to the first time;

process the second captured image to obtain second visual cues representing second input features;

determine a two dimensional position of the moving object to be tracked from the second captured image by estimating parameters of a two dimensional transformation on the determined object in the first captured image or the first input features that best match the determined object in the second captured image or the second input features;

estimate a depth of the moving object to be tracked at the first time based on a third cue obtained at the first time;

estimate a change of the depth of the moving object between the first time and the second time based on the third cue and a fourth cue obtained at the second time;

determine a relative change of size of the moving object to be tracked from the first captured image and the determined object from the second captured image by performing a two dimensional transformation on determined object in the first and second images or the first and second input features;

update the estimated depth and the change of the depth of the moving object to be tracked based on the relative change of the size of the moving object to be tracked;

combine the updated depth of the moving object to be tracked, the change of the depth of the moving object to be tracked, two dimensional position of the moving object to be tracked, and the two dimensional velocity of the moving object to obtain a three dimensional coordinate of the object at the second time; and output the three dimensional coordinate of the object to be tracked and tracking the moving object.

13. A humanoid robot including a processor and a memory storing instruction, the instructions when executed by the processor cause the processor to:

capture a first image at a camera at a first time;

process an image region of the first captured image to obtain first visual cues representing first input features of the moving object to be tracked, the image region in the first image being the region the moving object is expected to be located at the first time;

initialize a 2D tracker template based on the first input features;

capture a second image at the camera at a second time subsequent to the first time;

process the second captured image to obtain second visual cues representing second input features;

determine a two dimensional position of the moving object to be tracked from the second captured image by estimating parameters of a two dimensional transformation on the determined object in the first captured image or the first input features that best match the determined object in the second captured image or the second input features;

determine a two dimensional velocity of the object to be tracked based on the position of the moving object in the first and second captured images;

estimate a depth of the moving object to be tracked at the first time based on a third cue obtained at the first time;

estimate a change of the depth of the moving object to be tracked between the first time and the second time based on the third cue and a fourth cue obtained at the second time;

determine a relative change of size of the moving object to be tracked from the first captured image and the determined object from the second captured image by performing a two dimensional transformation on the determined object in the first and second captured images or the first and second input features;

update the estimated depth and the change of the depth of the moving object to be tracked based on the relative change of the size of the moving object to be tracked;

combine the updated depth of the moving object to be tracked, the change of the depth of the moving object to be tracked, two dimensional position of the moving object to be tracked, and the two dimensional velocity of the moving object to be tracked to obtain a three dimensional coordinate of the object to be tracked at the second time; and output the three dimensional coordinate of the object to be tracked and tracking the moving object.

14. The tracking apparatus of claim 13, wherein the depth of the object and the depth change of the object are estimated using Bayesian filters or Kalman filters.

15. An automobile including a processor and a memory storing instruction, the instructions when executed by the processor cause the processor to:

capture a first image at a camera at a first time;

process an image region of the first captured image to obtain first visual cues representing first input features of the moving object to be tracked, the image region in the first image being the region the moving object is expected to be located at the first time;

initialize a 2D tracker template based on the first input features;

capture a second image at the camera at a second time subsequent to the first time;

process the second captured image to obtain second visual cues representing second input features;

determine a two dimensional position of the moving object to be tracked from the second captured image by estimating parameters of a two dimensional transformation on the determined object in the first captured image or the first input features that best match the determined object in the second captured image or the second input features;

determine a two dimensional velocity of the object to be tracked based on the position of the moving object in the first and second captured images;

estimate a depth of the moving object to be tracked at the first time based on a third cue obtained at the first time;

estimate a change of the depth of the moving object to be tracked between the first time and the second time based on the third cue and a fourth cue obtained at the second time;

determine a relative change of size of the moving object to be tracked from the first captured image and the determined object from the second captured image by performing a two dimensional transformation on the determined object in the first and second captured images or the first and second input features;

update the estimated depth and the change of the depth of the moving object to be tracked based on the relative change of the size of the moving object to be tracked;

combine the updated depth of the moving object to be tracked, the change of the depth of the moving object to be tracked, two dimensional position of the moving object to be tracked, and the two dimensional velocity of the moving object to be tracked to obtain a three dimensional coordinate of the object to be tracked at the second time; and output the three dimensional coordinate of the object to be tracked and tracking the moving object.

16. The automobile of claim 15, wherein the depth of the object and the depth change of the object are estimated using Bayesian filters or Kalman filters.

17. A non-transitory computer readable storage medium configured to store instructions, the instructions when executed by a processor cause the processor to:

capture a first image at a camera at a first time;

process an image region of the first captured image to obtain first visual cues representing first input features of the moving object to be tracked, the image region in the first image being the region the moving object is expected to be located at the first time;

initialize a 2D tracker template based on the first input features;

capture a second image at the camera at a second time subsequent to the first time;

process the second captured image to obtain second visual cues representing second input features;

determine a two dimensional position of the moving object to be tracked from the second captured image by estimating parameters of a two dimensional transformation on the determined object in the first captured image or the first input features that best match the determined object in the second captured image or the second input features;

determine a two dimensional velocity of the object to be tracked based on the position of the moving object in the first and second captured images;

estimate a depth of the moving object to be tracked at the first time based on a third cue obtained at the first time;

estimate a change of the depth of the moving object to be tracked between the first time and the second time based on the third cue and a fourth cue obtained at the second time;

determine a relative change of size of the moving object to be tracked from the first captured image and the determined object from the second captured image by performing a two dimensional transformation on the determined object in the first and second captured images or the first and second input features;

update the estimated depth and the change of the depth of the moving object to be tracked based on the relative change of the size of the moving object to be tracked;

combine the updated depth of the moving object to be tracked, the change of the depth of the moving object to be tracked, two dimensional position of the moving object to be tracked, and the two dimensional velocity of the moving object to be tracked to obtain a three dimensional coordinate of the object to be tracked at the second time; and output the three dimensional coordinate of the object to be tracked and tracking the moving object.

18. The computer readable storage medium of claim 17, wherein the depth of the object and the depth change of the object are estimated using Bayesian filters or Kalman filters.

* * * * *